United States Patent
Kitaoka et al.

(10) Patent No.: US 8,511,926 B2
(45) Date of Patent: Aug. 20, 2013

(54) WATER-BASED BALLPOINT PEN

(75) Inventors: Nobuyuki Kitaoka, Aichi (JP); Hisashi Nakamura, Aichi (JP); Itsuka Goshima, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 266 days.

(21) Appl. No.: 12/922,794

(22) PCT Filed: Mar. 17, 2009

(86) PCT No.: PCT/JP2009/055725
§ 371 (c)(1),
(2), (4) Date: Sep. 15, 2010

(87) PCT Pub. No.: WO2009/116676
PCT Pub. Date: Sep. 24, 2009

(65) Prior Publication Data
US 2011/0013967 A1   Jan. 20, 2011

(30) Foreign Application Priority Data

Mar. 17, 2008   (JP) .................................. 2008-067601

(51) Int. Cl.
*B43K 7/10* (2006.01)
*C09D 11/00* (2006.01)

(52) U.S. Cl.
USPC ..... 401/215; 401/209; 106/31.49; 106/31.59; 106/31.78; 106/31.89

(58) Field of Classification Search
USPC ................... 401/209–215; 106/31.13, 31.68, 106/31.25, 31.86, 31.49, 31.59, 31.78, 31.89; 523/161
See application file for complete search history.

(56) References Cited

U.S. PATENT DOCUMENTS

| | | | |
|---|---|---|---|
| 3,746,456 A | 7/1973 | Hill | |
| 4,150,905 A | 4/1979 | Kaplan et al. | |
| 4,182,627 A | 1/1980 | Hardwick et al. | |
| 5,488,060 A * | 1/1996 | Shanker et al. | 514/362 |
| 5,580,374 A * | 12/1996 | Okumura et al. | 524/84 |
| 2006/0088363 A1 | 4/2006 | Kitaoka et al. | |
| 2007/0204761 A1* | 9/2007 | Sugimoto | 106/31.58 |

FOREIGN PATENT DOCUMENTS

| | | |
|---|---|---|
| CN | 1749336 | 3/2006 |
| CN | 1816600 | 8/2006 |
| EP | 0 694 596 | 1/1996 |
| JP | 58-201864 | 11/1983 |
| JP | 2000104003 A * | 4/2000 |
| JP | 3838183 | 8/2006 |
| JP | 2009074008 A * | 4/2009 |
| JP | 2010005797 A * | 1/2010 |
| WO | 2005/014736 | 2/2005 |

OTHER PUBLICATIONS

U.S. Appl. No. 12/919,543 to Katsuyuki Fujita, filed Aug. 26, 2010.
Chinese Office Action issued with respect to counterpart Chinese Application No. 200980109355.1, dated Sep. 11, 2012, with English translation thereof.
China Office action, dated Feb. 25, 2013 along with an English translation thereof.
Office Action from corresponding Chinese patent application, dated Jun. 9, 2013, and English language translation.

* cited by examiner

*Primary Examiner* — David Walczak
*Assistant Examiner* — Jennifer C Chiang
(74) *Attorney, Agent, or Firm* — Greenblum & Bernstein, P.L.C.

(57) ABSTRACT

A water-based ballpoint pen using a cemented carbide ball comprising tungsten carbide and a metal binder as a writing front end, wherein cobalt and/or nickel are contained in the cemented carbide ball as the metal binder in an amount of 1 to 20% by weight based on the total amount of the ball and which further includes an aqueous ink composition containing a colorant, water, a phosphate ester-based surfactant, and any one or more compounds of a thiadiazole represented by formula (1), 5-mercapto-3-phenyl-1,3,4-thiadiazole-2-thione or a salt thereof, and an oligomer of 2,5-dimercapto-1,3,4-thiadiazole:

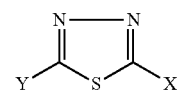

(1)

wherein X and Y each represents any substituent of $CH_3$, $NH_2$, and SM, and M represents any of hydrogen, an alkali metal, an ammonium, and an alkanolamine.

6 Claims, No Drawings

WATER-BASED BALLPOINT PEN

TECHNICAL FIELD

The present invention relates to a water-based ballpoint pen. More specifically, it relates to a water-based ballpoint pen excellent in corrosion resistance of the ball and exhibiting a high writing performance.

BACKGROUND ART

Heretofore, as a ball for a ballpoint pen, there has been used a ball such as a zirconia ball or a cemented carbide ball containing zirconium oxide, tungsten carbide, or the like as a main ingredient and further a binder composed of a metal.

Since a metal such as cobalt, chromium, titanium, or nickel is employed as the binder in the above ball, in the case where the ball is used in a water-based ballpoint pen, the binder is dissolved into an ink with the passage of time by the action of a corrosive ingredient (e.g., dissolved oxygen) in the ink. Thus, when the binder is removed from the ball, crystal particles of zirconium oxide, tungsten carbide, or the like as the main ingredient may fall away and/or the binder dissolved may be transformed into a metal oxide and insolubilized to adhere again to the surface of the ball, so that the ball sometimes becomes in a so-called corroded state. Since irregularities of the ball surface are increased by the corrosion, there are sometimes arise such problems that the rotation of the ball is inhibited to result in a heavy feel while writing, and a smooth flow of the ink is inhibited to cause blur in handwriting.

In particular, among the cemented carbide balls using tungsten carbide as a main ingredient, since a ball using cobalt or nickel as a binder has a large content of the binder, it has a defect that the ball tends to be corroded with the passage of time.

As a method of preventing the aforementioned corrosion with the passage of time, there has been disclosed a method of adding a sulfide compound into an ink (see, e.g., Patent Document 1).

[Patent Document 1] Japanese Patent No. 3838183

DISCLOSURE OF THE INVENTION

However, in the case of adding the above sulfide compound, since the ink may emit a foul odor and may cause precipitation with time for a long time in some cases, an anti corrosion effect is hardly sufficiently obtained and accordingly, the ink is insufficient to prevent the problems such as the bad feel while writing and the blur in handwriting.

The invention provides a water-based ballpoint pen with a good feel while writing, which hardly causes the proceeding of the ball corrosion with time and can maintain an excellent lubrication performance at writing.

Namely, the present invention is the following constitution.
(1) A water-based ballpoint pen using a cemented carbide ball comprising tungsten carbide and a metal binder as a writing front end,
wherein cobalt and/or nickel are contained in the cemented carbide ball as the metal binder in an amount of 1 to 20% by weight based on the total amount of the ball and,
wherein the ballpoint pen further comprises an aqueous ink composition comprising a colorant, water, a phosphate ester-based surfactant, and any one or more compounds of a thiadiazole represented by the formula (1), 5-mercapto-3-phenyl-1,3,4-thiadiazole-2-thione or a salt thereof, and an oligomer of 2,5-dimercapto-1,3,4-thiadiazole:

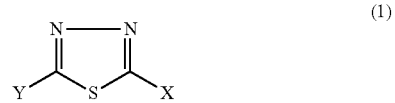

wherein X and Y each represents any substituent of $CH_3$, $NH_2$, and SM, and M represents any of hydrogen, an alkali metal, an ammonium, an alkanolamine, cyclohexylamine, and a cyclohexylalkanolamine.
(2) The water-based ballpoint pen according to the above (1), wherein the pH of the aqueous ink composition is from 7 to 13.
(3) The water-based ballpoint pen according to the above (1) or (2), wherein any one or more compounds of the thiadiazole, 5-mercapto-3-phenyl-1,3,4-thiadiazol-2-thione or a salt thereof, and an oligomer of 2,5-dimercapto-1,3,4-thiadiazole are added in the range of 0.01 to 10% by weight based on the total amount of the ink composition.
(4) The water-based ballpoint pen according to any one of the above (1) to (3), wherein the phosphate ester-based surfactant is added in the range of 0.01 to 10% by weight based on the total amount of the ink composition.

According to the invention, there can be provided a water-based ballpoint pen capable of persisting a smooth writing feel without causing any blur or skip in handwriting since corrosion phenomena such as dissolution of a binder into an ink and adhesion of insoluble matter onto a ball surface can be suppressed over a long period of time and also a high lubricating performance at writing can be maintained.

BEST MODE FOR CARRYING OUT THE INVENTION

In the invention, even in the case of a water-based ballpoint pen using as a writing front end a cemented carbide ball using tungsten carbide as a main ingredient and cobalt or nickel as a metal binder, the corrosion phenomena of the ball surface can be suppressed over a long period of time and a high lubricating performance at writing can be maintained by putting in the pen an aqueous ink comprising a phosphate ester-based surfactant and any one or more compounds of the thiadiazole represented by the formula (1), 5-mercapto-3-phenyl-1,3,4-thiadiazol-2-thione or a salt thereof, and an oligomer of 2,5-dimercapto-1,3,4-thiadiazole.

The ball to be applied to the above ballpoint pen is obtained by sintering a metal of Group 4a, 5a, or 6a or a carbide thereof together with a metal such as cobalt or nickel as a binder. In the present invention, there is applied a cemented carbide ball using tungsten carbide, which is chemically stable, has a high hardness, and is hardly abraded, as a main ingredient. In particular, a ball containing cobalt and/or nickel as a binder in the range of 1 to 20% by weight based on the total amount of the cemented carbide ball has a high strength and hence is preferably used.

In this connection, the ball may comprise titanium, vanadium, chromium, tantalum, or a carbide thereof as a metal of Group 4a, 5a, or 6a.

Since cobalt or nickel as the binder tends to be dissolved into an aqueous ink, the ball surface becomes coarse with the passage of time and further, in the longer term, tungsten carbide falls down through the dissolution of cobalt or nickel to result in more irregular ball surface in some cases. As a result, when the ball rotates in such a state that the ball is in contact with a ball-receiving seat, the receiving seat is severely abraded, so that there are apt to arise inconveniences that the writing feeling is impaired, the clearance between the ball and a ball housing in an axial direction increases and an ink flow increases to result in thick handwriting, and the occurrence of skip.

Moreover, as the above ball, there is preferably used a ball having a diameter ranging from 0.1 mm to 2.0 mm, preferably from 0.15 mm to 1.0 mm.

As the structure of the writing front end (tip) that holds the above ball, a general-purpose mechanism is effective and there may be applied a tip wherein a ball is held by a ball housing formed through inward pressure deformation from the outer surface in the vicinity of the front end of a metal pipe, a tip wherein a ball is held by a ball housing formed by cutting a metal material with a drill or the like, one wherein a ball to be held by a tip formed by cutting a metal pipe or a metal material is energized forward with the aid of a spring, or the like.

The barrel that is bonded to the above writing front end directly or via a connecting member has a form capable of containing an aqueous ink directly or after impregnation of an impregnation material (inner wad) therewith. For example, a shaped body made of a thermoplastic resin such as polyethylene, polypropylene or polyethylene terephthalate is suitably used in view of retard vaporization of the ink and productivity but it is also possible to use a metal processed body. Furthermore, with regard to the barrel made of a resin, the use of a transparent, colored transparent, or translucent shaped body may permit confirming the color of the ink, the remaining amount of the ink, and the like.

With regard to the ink composition to be put in the above barrel, in the case where the ink composition has a low viscosity, there may be mentioned a method of fitting an ink-retaining member to the front portion of the barrel and putting the ink composition directly in the barrel and a method of impregnating a porous body or a fiber processed body with the above ink composition and putting the same in the barrel.

In this connection, the above barrel may be one wherein, as a refill for ballpoint pen, the refill is put in an outer barrel.

In the ballpoint pen using the above barrel, any form of a cap type and a retractable may be applied. As the retractable ballpoint pen, all types may be used so far as they have such a structure that the writing front end provided on the ballpoint pen refill is placed in a state that the front end is open to the outer air and the writing front end is protruded from an opening of the outer barrel by the action of an in-and-out mechanism.

As an operating method of the in-and-out mechanism, for example, there may be mentioned a knock type, a rotary type, a sliding type, and the like.

The above knock type one has a knock part at an outer barrel rear end or an outer barrel lateral face and there may be exemplified a constitution wherein the writing front end of the ballpoint pen refill is moved inward or outward from the front opening of the outer barrel by pressing the knock part or a constitution wherein the writing front end of the ballpoint pen refill is moved inward or outward from the front opening of the outer barrel by pressing a clip part provided on the outer barrel.

The above rotary type has a rotary part at the outer barrel rear portion and there may be exemplified a constitution wherein the writing front end of the ballpoint pen refill is moved inward or outward from the front opening of the outer barrel by rotating the rotary part.

The above slide type one has a slide part at the lateral face of the barrel and there may be exemplified a constitution wherein the writing front end of the ballpoint pen refill is moved inward or outward from the front opening of the outer barrel by operating the slide or a constitution wherein the writing front end of the ballpoint pen refill is moved inward or outward from the front opening of the outer barrel by sliding a clip part provided on the outer barrel.

The above retractable ballpoint pen may be a retractable ballpoint pen of composite type comprising a plurality of ballpoint pen refills in the outer barrel.

To the aqueous ink composition to be included in the above ballpoint pen (barrel) are added any one or more compounds of a thiadiazole represented by the formula (1), 5-mercapto-3-phenyl-1,3,4-thiadiazol-2-thione or a salt thereof, and an oligomer of 2,5-dimercapto-1,3,4-thiadiazole and hence it is considered that dissolved oxygen or active oxygen species present in the ink, which is considered to be the cause of corrosion, seems to be inhibited from their direct action on the ball.

Specific examples of the thiadiazole represented by the above formula (1) include 2,5-dimethyl-1,3,4-thiadiazole, 2,5-diamino-1,3,4-thiadiazole, 2,5-dimercapto-1,3,4-thiadiazole, 2-methyl-5-mercapto-1,3,4-thiadiazole, 2-methyl-5-amino-1,3,4-thiadiazole, 2-amino-5-mercapto-1,3,4-thiadiazole, 5-mercapto-3-phenyl-1,3,4-thiadiazole-2-thione, and further, alkali metal salts, ammonium salts, alkanolamine salts, cyclohexylamine salts and cyclohexylalkanolamine salts thereof.

Any one or more compounds of the thiadiazole represented by the above formula (1), 5-mercapto-3-phenyl-1,3,4-thiadiazol-2-thione or a salt thereof, and an oligomer of 2,5-dimercapto-1,3,4-thiadiazole may be added in an amount of 0.01 to 10% by weight, preferably 0.1 to 5% by weight, based on the total amount of the ink composition.

When the amount is less than 0.01% by weight, it is difficult to obtain an expected effect, while even when it is added in an amount of more than 10% by weight, no improvement in anti corrosion effect is observed, so that the addition in an amount more than the upper limit is not necessary.

In this connection, as the oligomer of 2,5-dimercapto-1,3,4-thiadiazole, dimer to decamer thereof are used.

The phosphate ester-based surfactant to be used together with any one or more compounds of the thiadiazole represented by the formula (1), 5-mercapto-3-phenyl-1,3,4-thiadiazol-2-thione or a salt thereof, and an oligomer of 2,5-dimercapto-1,3,4-thiadiazole suppresses the seat abrasion at writing without inhibiting the anti corrosion effect of the above compounds and imparts a lubricating performance.

As the above phosphate ester-based surfactant, conventionally known ones such as phosphate monoesters, diesters, and triesters each composed of an aromatic or aliphatic functional group, an ethylene oxide group, and a phosphoric acid group are employed and, for example, one represented by the following formula (2) can be applied:

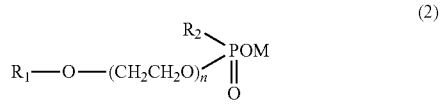

(2)

wherein $R_1$ represents an alkyl group having 8 to 18 carbon atoms, an alkenyl group, or a phenyl group or an alkylphenyl group; $R_2$ represents OH, OM, or $R_1$—O—$(CH_2CH_2O)_n$; M represents an alkali metal or an alkanolamine; and n represents a natural number of 1 to 30.

Specific examples may include Phosphanol RE-410, LE-500, RE-610, LE-700, RM-410, LM-400, LF-200, LF-205, RP-710, LP-700, RS-410, LS-500, RD-510Y, RB-410, LB-400, RA-600, GB-520, RD-720, ML-200, ML-210 (all mentioned above are manufactured by Toho Chemical Industry Co., Ltd.), and PLYSURF A212E, A210G, AL, A212C, A215C, A208B, A208S, A208F (all mentioned above are manufactured by Dai-Ichi Kogyo Seiyaku Co., Ltd.).

In particular, among the above phosphate ester-based surfactants, those having an HLB value of 5 to 15 are suitably used.

The above phosphate ester-based surfactant can be added in an amount of 0.01 to 10% by weight, preferably 0.1 to 5% by weight, based on the total amount of the ink composition.

When the amount is less than 0.01% by weight, it is difficult to obtain an expected effect, while even when it is added in an amount of more than 10% by weight, no improvement in lubricating performance is observed, so that the addition in an amount more than the upper limit is not necessary.

As the above colorant, usable are all dyes and pigments soluble or dispersible in aqueous media, and specific examples thereof are mentioned below.

As the above dyes, acid dyes, basic dyes, direct dyes, and the like are usable.

As the acid dyes, there are used New Coccine (C.I. 16255), Tartrazine (C.I. 19140), Acid Blue Black 10B (C.I. 20470), Guinea Green (C.I. 42085), Brilliant Blue FCF (C.I. 42090), Acid Violet 6B (C.I. 42640), Soluble Blue (C.I. 42755), Naphthalene Green (C.I. 44025), Eosine (C.I. 45380), Phloxine (C.I. 45410), Erythrosin (C.I. 45430), Nigrosine (C.I. 50420), Acid Flavin (C.I. 56205), and the like.

As the basic dyes, there are used Chrysoidine (C.I. 11270), Methyl Violet FN(C.I. 42535), Crystal Violet (C.I. 42555), Malachite Green (C.I. 42000), Victoria Blue FB (C.I. 44045), Rhodamine B (C.I. 45170), Acridine Orange NS(C.I. 46005), Methylene Blue B (C.I. 52015), and the like.

As the direct dyes, there are used Congo Red (C.I. 22120), Direct Sky Blue 5B (C.I. 24400), Violet BB (C.I. 27905), Direct Deep Black EX (C.I. 30235), Kayarus Black G Conc (C.I. 35225), Direct Fast Black G (C.I. 35255), Phthalocyanine Blue (C.I. 74180), and the like.

The pigments include inorganic pigments such as carbon black and ultramarine; organic pigments such as copper phthalocyanine blue and benzidine yellow; and aqueous pigment dispersion products prepared by finely and stably dispersing pigment in aqueous media by the use of surfactant etc. beforehand. The examples include:

C.I. Pigment Blue 15:3 B (trade name, S. S. Blue GLL manufactured by Sanyo Dye, having a pigment content of 22%), C.I. Pigment Red 146 (trade name, S. S. Pink FBL manufactured by Sanyo Dye, having a pigment content of 21.5%), C.I. Pigment Yellow 81 (trade name, TC Yellow FG manufactured by Dainichi Seika Kogyo, having a pigment content of about 30%), and C.I. Pigment Red 220/166 (trade name, TC Red FG manufactured by Dainichi Seika Kogyo, having a pigment content of about 35%).

As fluorescent pigments, fine particulate fluorescent pigments in synthetic resin are usable, wherein various fluorescent pigments are dissolved in respective resin matrixes to form solid solutions.

In addition, there may be exemplified pearl pigments; gold or silver metallic pigments; light-accumulating pigments; white pigments such as titanium dioxide to be used in an error-correcting pen; metal powders such as aluminum powder; and fragrant or fragrant capsule pigments.

The above colorant may be used either singly or as a suitable mixture of two or more thereof and is used in the range of 1 to 25% by weight, preferably 2 to 15% by weight in the ink composition.

Furthermore, if necessary, there may be used water-soluble organic solvents that are compatible to water and are conventionally commonly used. Specific examples include ethanol, propanol, butanol, glycerin, sorbitol, triethanolamine, diethanolamine, monoethanolamine, isopropanolamine, ethylene glycol, diethylene glycol, thiodiethylene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, sulfolane, 2-pyrrolidone, and N-methyl-2-pyrrolidone.

The water-soluble organic solvents may be used either singly or two or more thereof may be used in combination and is used in the range of 2 to 60% by weight, preferably 5 to 35% by weight.

Moreover, water-soluble resins and resin emulsion can be added for imparting fixing ability or tackiness toward paper. As the water-soluble resins and the resin emulsion, there may be mentioned alkyd resins, acrylic resins, styrene-maleic acid copolymers, cellulose derivatives, polyvinylpyrrolidone, polyvinyl alcohol, dextrin, oxidized polyethylene emulsion and oxidized polypropylene emulsion. The water-soluble resins and resin emulsion may be used either singly or two or more thereof may be used in combination and is used in the range of 1 to 30% by weight in the ink composition.

In addition, if necessary, there may be used pH-controlling agents including an inorganic salts such as sodium carbonate, sodium phosphate, and sodium acetate and organic basic compounds such as water-soluble amine compounds; rust-proofing agent such as benzotriazole, tolyltriazole, and saponin; preservatives or mildew-proofing agents such as carbolic acid, sodium salt of 1,2-benzisothiazolin-3-one, sodium benzoate, sodium dehydroacetate, potassium sorbate, propyl p-hydroxybenzoate, and 2,3,5,6-tetrachloro-4-(methylsulfonyl)pyridine; wetting agents such as urea, sorbitol, mannitol, sucrose, glucose, reducing starch hydrolyzate, and sodium pyrophosphate; defoaing agents; and fluorine-based surfactants and nonionic surfactants that improve permeability of the ink.

Furthermore, lubricants such as metal soap, polyalkylene glycol fatty acid esters, ethylene oxide-added cationic active agents, thiocarbamate salts, dimethyldithiocarbamate salts, N-acylamino acids, and N-acylmethyltaurine may be also used in combination.

Moreover, a shear-thinning property-imparting agent may be added into the ink composition.

As the above shear-thinning property-imparting agent, materials soluble or dispersible in water are effective and examples thereof include xanthan gum, welan gum, succinoglycan that is an organic acid-modified heteropolysaccharide composed of glucose and galactose as constitutive monosaccharides (average molecular weight of about 100 to 8,000,000), guar gum, locust bean gum and its derivatives, hydroxyethyl cellulose, alkyl alginates, polymers composed of alkyl methacrylate as a main ingredient and having a molecular weight of 100,000 to 150,000, glucomannan, carbohydrates having a gelling ability and extracted from seaweed such as agar and carrageenan, benzylidenesorbitol and benzylidenexylitol and their derivatives, crosslinking acrylic acid polymers, inorganic fine particles, nonionic surfactants having HLB value of 8 to 12, metal salts and amine salts of dialkyl sulfosuccinates, and the like. In addition, a stable shear-thinning property can be imparted by adding N-alkyl-2-pyrrolidone and an anionic surfactant in combination into the ink composition.

The above ink composition is adjusted to a pH applicable to general-purpose aqueous ballpoint'pens and it is preferred to adjust the composition to a neutral to alkaline region of pH 7 to pH 13, preferably a weakly alkaline region of pH 7.1 to pH 12, more preferably pH 7.1 to pH 11.

Since the thiadiazole represented by the formula (1), 5-mercapto-3-phenyl-1,3,4-thiadiazol-2-thione or a salt thereof, and the oligomer of 2,5-dimercapto-1,3,4-thiadiazole can be stably present in ink by the adjustment to the above pH, the corrosion of the ball can be more efficiently suppressed.

Furthermore, after the above ink composition is filled into the barrel, an ink follower (liquid stopper) can be placed at the rear end of the ink therein.

As the ink follower, either a liquid one or a solid one may be used. Examples of the liquid ink follower include nonvolatile media such as polybutene, α-olefin cooligomers, silicone oils and purified mineral oils, and, if desired, silica, aluminum silicate, swellable mica, or a fatty acid amide may be added to the above medium. Moreover, as the solid ink follower, a resin shaped material may be mentioned. It is also possible to use the above liquid and solid ink follower in combination.

Examples

The following will explain Examples but the invention is not limited to these Examples.
Preparation of Ink
The following tables show compositions of aqueous inks of Examples and Comparative Examples. In this connection, the numerical values in the tables are represented as part(s) by weight.

TABLE 1

| Name of raw material | Note | Example | | | | | | | |
|---|---|---|---|---|---|---|---|---|---|
| | | 1 | 2 | 3 | 4 | 5 | 6 | 7 | 8 |
| Blue dye | (1) | 3.0 | | 3.0 | 3.0 | | 3.0 | | |
| Red dye | (2) | | 3.0 | | | 3.0 | | 3.0 | 3.0 |
| Propylene glycol | | 20.0 | | 20.0 | 20.0 | 10.0 | 20.0 | 10.0 | |
| Glycerin | | | 20.0 | | | 10.0 | | 10.0 | 20.0 |
| Triethanolamine | | 1.0 | 2.5 | 1.5 | 1.0 | 2.7 | 1.0 | 3.0 | 2.5 |
| Carbolic acid | | 0.3 | 0.3 | 0.3 | 0.3 | 0.3 | 0.3 | 0.3 | 0.3 |
| Thickener | (3) | 0.3 | 0.3 | 0.3 | 0.3 | | 0.3 | | 0.3 |
| Phosphate ester-based surfactant A | (4) | 0.5 | | | 1.0 | 0.7 | 1.0 | 0.7 | |
| Phosphate ester-based surfactant B | (5) | | 0.5 | | | | | | 0.5 |
| Phosphate ester-based surfactant C | (6) | | | 0.5 | | | | | |
| Thiadiazole A | (7) | 0.5 | 2.0 | | | 2.0 | | | |
| Thiadiazole B | (8) | | | 1.0 | 0.5 | | | | |
| Thiadiazole C | (9) | | | | | | 0.5 | | |
| Thiadiazole D | (10) | | | | | | | 0.5 | |
| Thiadiazole E | (11) | | | | | | | | 2.0 |
| Ion-exchange water | | 74.4 | 71.4 | 73.4 | 73.9 | 71.3 | 73.9 | 72.5 | 71.4 |
| Total | | 100.0 | 100.0 | 100.0 | 100.0 | 100.0 | 100.0 | 100.0 | 100.0 |
| pH | | 7.3 | 7.8 | 7.5 | 7.3 | 8.0 | 7.9 | 8.0 | 7.6 |

TABLE 2

| Name of raw material | Note | Comparative Example | | | | | |
|---|---|---|---|---|---|---|---|
| | | 1 | 2 | 3 | 4 | 5 | 6 |
| Blue dye | (1) | 3.0 | | 3.0 | 3.0 | | |
| Red dye | (2) | | 3.0 | | | 3.0 | 3.0 |
| Propylene glycol | | 20.0 | | 20.0 | 20.0 | 10.0 | 10.0 |
| Glycerin | | | 20.0 | | | 10.0 | 10.0 |
| Triethanolamine | | 1.0 | 2.5 | 1.5 | 1.0 | 2.7 | 3.0 |
| Carbolic acid | | 0.3 | 0.3 | 0.3 | 0.3 | 0.3 | 0.3 |
| Thickener | (3) | 0.3 | 0.3 | 0.3 | 0.3 | | |
| Phosphate ester-based surfactant A | (4) | 0.5 | | | 1.0 | 0.7 | |
| Phosphate ester-based surfactant C | (6) | | | 0.5 | | | |
| Thiadiazole A | (7) | | 2.0 | | | | |
| Thiadiazole D | (10) | | | | | | 2.0 |
| Sulfide compound | (12) | | | 1.0 | 0.5 | | |
| Ion-exchange water | | 74.9 | 71.9 | 73.4 | 73.9 | 73.3 | 71.7 |
| Total | | 100.0 | 100.0 | 100.0 | 100.0 | 100.0 | 100.0 |
| pH | | 8.3 | 7.8 | 7.5 | 7.3 | 9.0 | 8.9 |

The raw materials in the tables are explained along the number of Note.

(1) trade name: Acid Blue PG, manufactured by Sumitomo Chemical Co., Ltd.
(2) trade name: Floxcin, manufactured by Hodogaya Chemical Co., Ltd.
(3) trade name: KELZAN, manufactured by Sansho Co., Ltd.
(4) trade name: PLYSURF AL (HLB=5.6), manufactured by Dai-Ichi Kogyo Seiyaku Co., Ltd.
(5) trade name: PLYSURF A212E (HLB=10.3), manufactured by Dai-Ichi Kogyo Seiyaku Co., Ltd.

(6) trade name: Amizett 52P, manufactured by Kawaken Fine Chemicals Co., Ltd.
(7) 2,5-dimercapto-1,3,4-thiadiazole
(8) dimer of 2,5-dimercapto-1,3,4-thiadiazole
(9) 2-methyl-5-mercapto-1,3,4-thiadiazole
(10) 2-amino-5-mercapto-1,3,4-thiadiazole
(11) 5-mercapto-3-phenyl-1,3,4-thiadiazole-2-thione potassium salt
(12) potassium hydroquinonesulfonate In the compositions of the above Examples and Comparative Examples, after ingredients other than a shear-thinning property-imparting agent were added to water and the mixture was mixed and stirred, the shear-thinning property-imparting agent was added in the case where the composition contained it and the resulting mixture was stirred at 25° C. at 400 rpm in a dispersator for 1 hour and then filtrated to prepare each ink.

Preparation of Ink Follower

Into 98.5 parts of polybutene as a base oil was added 1.5 parts of a fatty acid amide as a thickener, and then the mixture was kneaded in a three-roll mill to prepare an ink follower.

Construction of Water-Based Ballpoint Pen A

Each of the ink composition of the above Examples 1 to 4, 6, and 8 and Comparative Examples 1 to 4 was filled into a ballpoint pen refill that had been constructed by fitting a stainless steel tip holding a WC—Co cemented carbide ball A having a diameter of 0.3 mm, into one end of a polypropylene pipe. After the above ink follower was arranged at the rear end of the refill, the refill was inserted into an outer barrel (cap type) to construct a sample ballpoint pen.

Construction of Water-Based Ballpoint Pen B

Each of the ink composition of the above Examples 1 to 4, 6, and 8 and Comparative Examples 1 to 4 was filled into a ballpoint pen refill that had been constructed by fitting a stainless steel tip holding a WC—Ni cemented carbide ball B having a diameter of 0.4 mm, into one end of a polypropylene pipe. After the above ink follower was arranged at the rear end of the refill, the refill was inserted into an outer barrel (cap type) to construct a sample ballpoint pen.

Construction of Water-Based Ballpoint Pen C

Each of the ink composition of the above Examples 5 and 7 and Comparative Examples 5 and 6 was put in a barrel and a comb type ink-retaining member that had been constructed by fitting a stainless steel tip holding a WC—Co cemented carbide ball A having a diameter of 0.5 mm to the writing front end was installed to construct a sample ballpoint pen C.

Using the above ink compositions and the water-based ballpoint pens, the following tests were performed.

Ball Corrosion Test 5 g of each ink prepared was transferred into a sample vial and two kinds of the cemented carbide balls A and B (A: WC—Co, B: WC—Ni) were immersed therein. After the vial was capped, it was allowed to stand under the environment of 70° C. for 30 days. Then, the surface conditions of each ball were observed on an optical microscope (magnification of 1000 times) at room temperature.

Writing Test

The sample ballpoint pens A to C on which capability of writing had been confirmed were allowed to stand in a horizontal state under the environment of 50° C. for 60 days. Thereafter, writing feel at the time when spiral circles were continuously written by hand on a writing paper and conditions of the handwriting were checked visually.

The results of the above tests are shown in the following tables.

TABLE 3

|  |  | Example | | | | | | | | Comparative Example | | | | | |
|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 |
| Ball Corrosion test | A | ○ | ○ | ○ | ○ | ○ | ○ | ○ | ○ | x | Δ | x | x | x | Δ |
|  | B | ○ | ○ | ○ | ○ | ○ | ○ | ○ | ○ | x | Δ | x | x | x | Δ |
| Writing test | A | ○ | ○ | ○ | ○ | — | ○ | — | ○ | x | Δ | x | x | — | — |
|  | B | ○ | ○ | ○ | ○ | — | ○ | — | ○ | x | Δ | x | x | — | — |
|  | C | — | — | — | — | ○ | — | ○ | — | — | — | — | — | x | Δ |

Sign "—" means that sample ballpoint pens were not prepared.

The evaluation of the test results is as follows.

Ball Corrosion Test

○: No change is observed as compared with the initial state

Δ: Luster is lost as compared with the initial state x: Surface is rough or precipitation or attached mater is observed as compared with the initial state Writing Test ○: Smooth writing is possible and good handwriting is shown Δ: Scratching feel is perceived at writing and slight blur and skip are observed in handwriting x: Writing feel is poor and a lot of blur and skip are observed or writing is impossible.

While the invention has been described in detail and with reference to specific embodiments thereof, it will be apparent to one skilled in the art that various changes and modifications can be made therein without departing from the spirit and scope thereof.

This application is based on a Japanese patent application No. 2008-067601 filed on Mar. 17, 2008 and the contents thereof are herein incorporated by reference.

INDUSTRIAL APPLICABILITY

The invention provides a water-based ballpoint pen with a good feel while writing, which hardly causes the proceeding of the ball corrosion with time and can maintain an excellent lubrication performance at writing.

The invention claimed is:

1. A water-based ballpoint pen using a cemented carbide ball comprising tungsten carbide and a metal binder as a writing front end, wherein cobalt and/or nickel are contained in the cemented carbide ball as the metal binder in an amount of 1 to 20% by weight based on the total amount of the ball and, wherein the ballpoint pen further comprises an aqueous ink composition comprising a colorant, water, a phosphate ester-based surfactant, and any one or more compounds of a thiadiazole represented by the formula (1), 5-mercapto-3- phenyl-1,3,4-thiadiazole-2-thione or a salt thereof, and an oligomer of 2,5-dimercapto-1,3,4-thiadiazole:

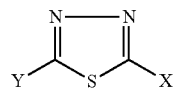
(1)

wherein X and Y each represents any substituent of $CH_3$, $NH_2$, and SM, and M represents any of hydrogen, an alkali metal, an ammonium, an alkanolamine, cyclohexylamine, and a cyclohexylalkanolamine.

2. The water-based ballpoint pen according to claim 1, wherein the pH of the aqueous ink composition is from 7 to 13.

3. The water-based ballpoint pen according to claim 1, wherein any one or more compounds of the thiadiazole, 5-mercapto-3-phenyl-1,3,4-thiadiazol-2-thione or a salt thereof, and an oligomer of 2,5-dimercapto-1,3,4-thiadiazole are added in the range of 0.01 to 10% by weight based on the total amount of the ink composition.

4. The water-based ballpoint pen according to claim 1, wherein the phosphate ester-based surfactant is added in the range of 0.01 to 10% by weight based on the total amount of the ink composition.

5. The water-based ballpoint pen according to claim 1, wherein the phosphate ester-based surfactant is a compound represented by the following formula (2):

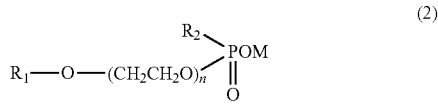
(2)

wherein $R_1$ represents an alkyl group having 8 to 18 carbon atoms, an alkenyl group, a phenyl group, or an alkylphenyl group; $R_2$ represents OH, OM, or $R_1$—O—$(CH_2CH_2O)_n$; M represents an alkali metal or an alkanolamine; and n represents a natural number of 1 to 30.

6. The water-based ballpoint pen according to claim 1, wherein the phosphate ester-based surfactant has an HLB value of 5 to 15.

* * * * *